United States Patent [19]

Gabriel et al.

[11] 4,292,231

[45] Sep. 29, 1981

[54] PRESSURE SENSITIVE ADHESION COMPOSITIONS

[75] Inventors: Hans R. L. Gabriel, Mariemont; Larry K. Post, Columbus; Billy M. Culbertson, Worthington, all of Ohio; Curtis M. Graham, Lilburn, Ga.

[73] Assignee: Ashland Oil, Inc., Ashland, Ky.

[21] Appl. No.: 124,675

[22] Filed: Feb. 26, 1980

[51] Int. Cl.³ .......................... C08F 8/42; C08K 5/05; C08F 226/02; C08L 33/08
[52] U.S. Cl. ..................... 260/33.4 UR; 260/33.4 PQ; 428/40; 428/41; 428/42; 428/43; 428/44; 428/343; 428/349; 428/356; 525/328; 525/329; 525/370; 526/301; 528/9; 528/367; 528/392
[58] Field of Search ................... 526/301; 528/369, 9; 525/328, 329, 359, 370; 260/33.4 UR, 33.4 PQ, 33.2 R; 428/355, 356

[56] References Cited

U.S. PATENT DOCUMENTS

| | | | |
|---|---|---|---|
| 2,856,386 | 10/1958 | Smith et al. | 526/301 |
| 3,532,708 | 10/1970 | Blance | 260/33.4 R |
| 3,701,758 | 10/1972 | Maska | 428/355 |
| 3,769,254 | 10/1973 | Anderson et al. | 260/33.4 PQ |
| 3,861,956 | 1/1975 | Schwarcz | 428/355 |
| 3,886,126 | 5/1975 | McKenna | 260/33.6 UA |
| 4,005,247 | 1/1977 | Graham | 428/356 |
| 4,185,051 | 1/1980 | McKenna et al. | 525/370 |

FOREIGN PATENT DOCUMENTS 756422 9/1956 United Kingdom .

Primary Examiner—Paul Lieberman
Assistant Examiner—Herbert J. Lilling
Attorney, Agent, or Firm—Wood, Herron & Evans

[57] ABSTRACT

Pressure-sensitive adhesives having improved cohesive strength are formed by reacting an acrylic interpolymer with a metal alkoxide or chelated metal alkoxide such as a chelated ester of orthotitanic acid. The novel feature of this invention comprises the use of an interpolymer containing a vinyl monomer which contains both a carboxylic acid and a carbamate functional group.

10 Claims, No Drawings

PRESSURE SENSITIVE ADHESION COMPOSITIONS

FIELD OF THE INVENTION

This invention relates to crosslinking acrylic interpolymers with metal alkoxides and chelated metal alkoxides such as chelated esters of orthotitanic acid for use as pressure-sensitive adhesives.

DESCRIPTION OF THE PRIOR ART

Pressure-sensitive adhesive resins are widely employed in the form of film-like coatings on a variety of superstrates to bond the latter to a normally non-adhering substrate. Once a bond has been made by applying a pressure-sensitive film between a substrate and a superstrate, the pressure-sensitive film may be subjected to substantial stress. Therefore, pressure-sensitive resins must exhibit a requisite high degree of adhesive strength as well as permanent tackiness. Tack is normally inversely related to the plasticity of the polymer, which is a measure of the deformability of the polymer under an applied load. These properties can be readily built into an acrylic polymer to a large extent by an appropriate choice of the constituent monomers.

The cohesive strength of the resin generally increases as the molecular weight of the resin increases. However, as the molecular weight increases, so does the viscosity. Because of current coating procedures, a manageable viscosity at a reasonably high solid content is required. The goal of this invention is to increase the cohesive strength of the resin while maintaining a manageable viscosity.

The solution to this problem lies in coating the superstrate with an organic solution of acrylic interpolymers of moderately high molecular weight which contain functional groups capable of crosslinking through the medium of a metal alkoxide or chelated metal alkoxide.

Conventionally, three types of monomers are used to prepare the interpolymer. The bulk of the interpolymer (40-80%) consists of one or more esters of acrylic or methacrylic acid which contain 7 to 20 carbon atoms in the alkoxy moeity. These vinyl compounds incorporate internal plasticization in contributing to a large free volume in the copolymer. In addition, these monomers serve to enhance segmental mobility thereby increasing the wetting ability of the final polymerization product.

Another type of monomer conventionally used in preparing interpolymers of the aforesaid type imparts a substantial degree of cohesive strength properties by stiffening the molecular chains. Such monomers include vinyl esters of $C_3$-$C_{10}$ alkanoic acids, ethyl and methyl esters of acrylic and methacrylic acids, acrylonitriles, styrene, vinyl chloride and the like.

The third monomer, although used in a relatively small amount, serves a critical function i.e., providing the crosslinking sites. Prior art monomers include vinyl compounds having free hydroxyl, carboxyl, amine, or acid anhydride groups. The present invention lies in the use of vinyl monomers containing both a carboxylic acid and a carbamate functionality to provide the crosslinking site for the metal chelate.

SUMMARY OF THE INVENTION

The adhesive compositions of the present invention comprise an adhesive polymer formed by the reaction of a metal alkoxide or a chelated metal alkoxide such as the chelated esters of orthotitanic acid with an interpolymer. The interpolymer comprises:

A. At least 40 weight percent of an ester of acrylic or methacrylic acid containing from 7 to 20 carbon atoms;

B. 0.2 to 20 weight percent of a vinyl type monomer which contains both a carboxylic acid and a carbamate functionality.

C. Optionally up to 59.8 weight percent of one or more additional copolymers which contain an ethylenically unsaturated linkage, such linkage being the only functional group within the monomer which will react with the metal alkoxide. Representatives of such monomers include vinyl esters of $C_3$-$C_{10}$ alkonoic acids, ethyl and methyl esters of acrylic and methacrylic acids, acrylonitrile, sytrene, vinyl chloride and the like.

The interpolymer formed from the monomers listed above are then crosslinked by metal alkoxides or chelated metal esters; especially preferred are chelated metal esters of orthotitanic acid.

The adhesives of the present invention exhibit increased thumb appeal and adhesion promotion. The interpolymers thus prepared containing vinyl monomers with both carboxylic acid and carbamate functional groups exhibit a manageable viscosity at a reasonably high solids content and can be crosslinked at room temperature. Therefore, these compounds are ideal for use in preparation of pressure-sensitive adhesives.

DETAILED DESCRIPTION OF THE INVENTION

Preparing the adhesive compositions of this present invention involves crosslinking acrylic or vinyl copolymers with metal alkoxides and chelated metal alkoxides, such as chelated esters of orthotitanic acid. The acrylic or vinyl copolymer is a mixture of two or three types of monomers.

Group I, which makes up the largest percentage of the mixture, includes one or more esters of acrylic or methacrylic acid containing from about 7 to 20 carbon atoms in the alkoxy moiety. The compounds included in this group are well known.

Group II contains vinyl monomers which contain both an acid and a carbamate group. These monomers provide the crosslinking sites for the metal alkoxides or chelated metal alkoxides such as chelated esters of orthotitanic acid. The general formula of this compound is:

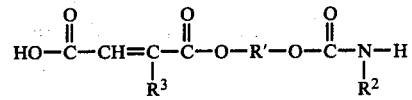

Where $R^1$ represents alkyl, aryl, substituted alkyl, and substituted aryl groups; $R^2$ represents hydrogen, alkyl, aryl, substituted alkyl and substituted aryl groups, and $R^3$ represents hydrogen, alkyl, aryl, substituted alkyl, substituted aryl and halogen groups.

Representative monomers of this present invention are:
2-Maleoxyethyl Carbamate
2-Maleoxyethyl N-Methylcarbamate
2-Maleoxyethyl N-Ethylcarbamate
2-Maleoxyethyl N-Butylcarbamate
2-Maleoxyethyl N-Phenylcarbamate
2-Maleoxypropyl Carbamate
2-Maleoxypropyl N-Methylcarbamate 2-Maleoxypropyl N-Ethylcarbamate
2-Maleoxypropyl N-Butylcarbamate
2-Maleoxypropyl N-Phenylcarbamate
4-Maleoxybutyl Carbamate
4-Maleoxybutyl N-Methylcarbamate
4-Maleoxybutyl N-Ethylcarbamate
4-Maleoxybutyl N-Butylcarbamate
4-Maleoxybutyl N-Phenylcarbamate

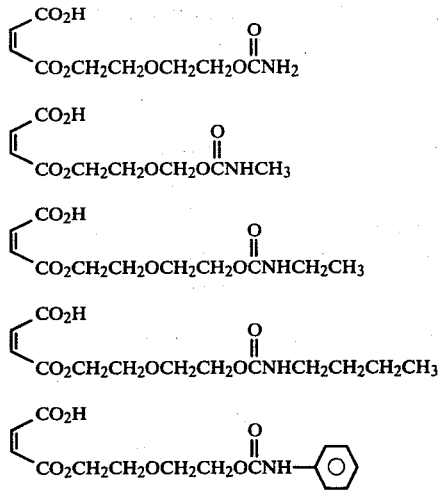

As generally described in British Pat. No. 756,422, one type of Group II monomer can be produced by reacting mono urethanes of glycol having the formula:

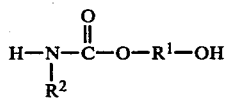

with a diacid having the general formula:

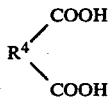

to produce:

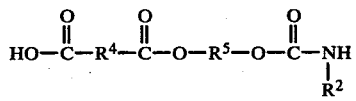

When $R^4$ contains a vinyl group having the general formula:

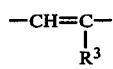

($R^3$ is attached to the carbon atom closest to the ester group) the product of this reaction is suitable for use in this invention. $R^5$ represents alkyl, aryl, substituted alkyl and substituted aryl groups.

Group III comprises addition copolymerizable monomers devoid of any functional group except for the polymerizable ethylenic linkage. Representative monomers of this group includes α-olefins containing two to ten carbon atoms, vinyl esters of alkanoic acids containing three to ten carbon atoms, ethyl and methyl esters of acrylic and methacrylic acids, acrylonitrile, methacrylonitrile, styrene and vinyl chloride. Monomers of this type are optional, but enhance the quality of the adhesive by imparting a substantial degree of cohesive strength because they stiffen the molecular chains. Once again the compounds included within this group are well known in the art of pressure-sensitive adhesives.

The interpolymers used to form the adhesives are made up of at least 40% by weight of monomers from Group I, 0.2 to 20% by weight of monomers from Group II and from 0 to 59.8% of monomers from group III.

The interpolymers herein are normally tacky and the composition of the interpolymer is chosen in accordance with known practice so as to provide a product of suitable tack.

The special interpolymers of this invention are conveniently prepared by organic solvent polymerization techniques involving in some cases delayed addition of monomer when there is a great disparity between reactivity ratios as for example between the reactivity ratios of vinyl acetate and acrylate monomers. The time interval for the delayed addition may range from about 60 to 600 minutes and longer. The techniques in general, involve the polymerization of the respective monomer mixtures in suitable organic solvents, the polymerization being initiated by heat activated free radical initiators.

The choice of solvents for the interpolymer used in the practice of this invention is governed by the solubility requirements of the monomers and the resulting interpolymers in that both the monomers and the resulting interpolymers should be soluble in the selected solvent or mixtures of solvents. A further requirement is that the interpolymer solution should contain less than 3% water by weight, based on the total weight of the solvent, in order to avoid adverse interference with the metal alkoxide component. More preferably, the interpolymer solution should contain less than 2% water by weight.

Examples of suitable solvents for the interpolymers include aromatic solvents such as benzene, toluene, xylene, etc. Suitable aliphatic solvents include esters such as ethyl acetate, propyl acetate, isopropyl acetate, butyl acetate, etc.; ketones such as methyl ethyl ketone, acetone, etc.; aliphatic hydrocarbons such as hexane, pentane, etc. Especially useful are mixtures of the foregoing.

The polymer systems of this invention may also be prepared in mass or non-aqueous dispersion type polymerization processes as are well known to those skilled in the art. However, solution polymerization processes are preferred.

Polymerization initiators suitable for the preparation of the special interpolymers of this invention include organic peroxides, such as tert-butyl hydroperoxide, di-tert-butylperoxide, cumene hydroperoxide, di-cumyl peroxide, benzoyl peroxide and the like. Equally suitable are organic peroxygen compounds such as tert-butyl peracetate, tert-butyl perbenzoate, di-tert-butyl perphthalate; other initiators would include 2,2'-azodiisobutyronitrile, ultraviolet light, gamma radiation, etc.

The interpolymer, as described above, is reacted with a metal alkoxide to provide the adhesive polymer employed in the invention.

The metal alkoxides which may be used herein may be any metal alkoxide having the formula $R_nT(OR_1)_z$, wherein T is a metal selected from the group consisting of Groups II, (including the transition elements) III, IV and V of the Periodic Table; $R_n$ is selected from the group consisting of alkyl radicals of from 1 to 8 carbon atoms such as methyl, ethyl, butyl, iso-octyl and the like and aryl radicals of from 6 to 16 carbon atoms such as benzyl. $R_1$ is selected from the group consisting of aliphatic and substituted aliphatic radicals containing from 1 to 18 carbon atoms, such as alkyl groups, allyl groups and the like; n is an integer whose value is zero or greater and z is an integer of at least 2, wherein the sum n+z is greater than 1 and is equal to the valence of the metal represented by T.

Examples of metal alkoxides for use in the practice of this invention include the following: magnesium ethoxide, calcium ethoxide, strontium ethoxide, barium ethoxide, aluminum ethoxide, aluminum isopropoxide, lanthanum t-butoxide, ferric ethoxide, ferric isopropoxide, titanium ethoxide, titanium isopropoxide, titanium butoxide, cupric isopropoxide, cobaltic isopropoxide, zinc isopropoxide, nickel isopropoxide, zirconium ethoxide, zirconium isopropoxide, zirconium butoxide, hafnium ethoxide, hafnium isopropoxide, cerium isopropoxide, germanium isopropoxide, stannic ethoxide, stannic isopropoxide, vanadium isopropoxide, chromium t-butoxide, niobium ethoxide, niobium isopropoxide; also included are double alkoxides such as sodium zirconium isopropoxide, potassium zirconium ethoxide, magnesium aluminum ethoxide, potassium aluminum butoxide, sodium stannic ethoxide, and alkyl metal alkoxides such as diethoxy ethyl aluminum, dibutoxy diphenyl titanium, phenyl triisopropoxy titanium, dimethyl diisopropoxy, titanium, dibutyl dimethoxy tin and the like.

The preferred metal alkoxides are aluminum isopropoxide and titanium esters such as alkyl titanates such as ortho titanic acid esters of monofunctional alcohols and tetraaryl esters. Examples of alkyl titanates include tetramethyl titanate, tetraethyl titanate, tetrapropyl titanate, tetraisopropyl titanate, tetrabutyl titanate, tetra-2-ethyl-hexyl titanate, and tetrastearyl titanate. As indicated, tetraphenyl titanate and other tetraaryl esters are also included.

The metal alkoxides, including the lower alkyl titanates, have the disadvantage of being extremely reactive and have a tendency to gel in combination with the acrylic interpolymer. This tendency limits the ability to store the formulated adhesive for any appreciable period. While this tendency can be minimized to some extent by proper choice of the components of the interpolymer and the level of titanate ester utilized, it has been found that a chelated metal alkoxide unexpectedly will solve any stability problems while retaining the strength. It has been found that the chelated esters are not subject to the storage disadvantage and provide formulated adhesives which can be stored for relatively long periods without substantial increase in viscosity.

The chelated titanium esters which are employed in the preferred embodiment of the invention are formed by coordinate bonding between titanium and electron-donating atoms, such as oxygen or nitrogen. The preparation of such chelated esters is described in U.S. Pat. Nos. 2,453,520, 2,468,916, 2,870,181 and 2,824,114 and in British Pat. No. 74,113. The preferred chelated esters employed in the invention are those which are commercially available, which include those formed from octylene glycol, triethanolamine, 2,4-pentanedione, and lactic acid. Thus, completely chelated esters such as titanium acetylacetonate, when added to the interpolymer solution form a more stable, crosslinkable solution, which upon evaporation of solvent forms a crosslinked polymer matrix.

It is noted that the chelating agents such as the glycol, hydroxy acid, keto ester, or aminoalcohol may also be added to the composition as an excess to achieve better stability. Small excesses (based on polymer solids) of the chelating agents have been found to be extraordinarily effective. The chelating agent may be added directly to the composition or it may be added to the metal alkoxide. The mechanism for the increased stability due to the presence of excess chelating agent is not understood.

The relative proportions of acrylic interpolymer and metal alkoxide employed in producing the adhesive polymers of the invention can be varied and depend to some extent upon the nature of the interpolymer and the particular metal alkoxide or chelated metal alkoxide utilized. In most cases, however, there is employed from about 0.05 percent to about 5 percent by weight of the metal alkoxide or chelated metal alkoxide based on the total polymer.

The reaction between the metal alkoxide or chelated metal alkoxide and the acrylic interpolymer does not require special conditions. Ordinarily, the reaction takes place upon coating and drying the mixture at moderate temperatures, such as 50° C. to 150° C.; higher or lower temperatures can be used, depending upon the desired reaction time.

The adhesive composition is essentially composed of the adhesive polymer, described above, in an organic solvent. In order to provide maximum storage stability, it is important that the solvent contain a substantial proportion, e.g., at least about 20 percent by weight, of an alcohol. Any liquid alcohol of suitable volatility can be employed, although lower alkanols, such as ethanol, propanol, isopropanol and butanol, are preferred. Other alcohol solvents that can be utilized include methyl Cellosolve, butyl Cellosolve, diacetone alcohol, and the like. The remainder of the solvent can be any of the organic materials ordinarily utilized for this purpose and in which the interpolymer is soluble or dispersible, including esters, ketones, hydrocarbons, etc. Other aliphatic hydrocarbon solvents, such as heptane may be included as they permit the coating of the adhesive directly onto solvent sensitive backings with facility and they dry quickly. It is also important that as little water as possible be present as the water hydrolizes and deactivates the metal alkoxide.

There can also be included in the adhesive composition additive materials which do not affect the basic properties of the adhesive. Fillers, tackifiers, antioxidants, stabilizers, and the like are thus, sometimes added to the formulated adhesive.

The adhesive can be employed in various forms. For instance, it can be cast as a free film interleaved between sheets of release paper and employed in a transfer operation. In other methods of utilization, the adhesive is coated onto a backing member and dried to provide pressure-sensitive adhesive coated materials, such as tapes, sheets or panels. Alternatively, the adhesive may be coated onto a release material and then dried and transferred to a backing member. Cellophane, vinyls, cloth, Mylar, rubber, various laminates, and other such flexible materials, as well as wood, metal, hardboard and other less flexible backings, can be coated in this manner. The adhesives of this invention may also be used for decorative coatings, outdoor decals, and signs. In some cases, the adhesive can be used as a liquid adhesive and applied just prior to use.

In any event, the dried adhesive composition forms a tacky adhesive which adheres to various substrates to provide a bond of high cohesive strength, thus making these adhesives especially desirable in uses where holding ability and retention of strength over a period of time are necessary.

The following examples I and III demonstrate working systems utilizing applicants' invention. Example II was included to demonstrate that applicants' invention requires a monomer containing both a carbamate group and an acid group. In this example, a monomer containing a carbamate group and an ester group was employed. The results are noticably poor.

EXAMPLE I

A reactor was charged with 668 parts 2-ethylhexyl acrylate, 48 parts ethyl acrylate, 174 parts vinyl acetate, 99.9 parts 2-maleoxyethyl carbamate and 512 parts ethyl acetate and slowly heated under $N_2$ to 85° C. At this point, 1 part of benzoyl peroxide was added. The mixture was maintained at 85°–88° C. for 45 minutes. Then 200 parts isopropanol, 200 parts methylene chloride and 1 part benzoyl peroxide were added and the mixture maintained at temperature 2 hours. Then 162 parts toluene, 260 parts ethyl acetate and 1 part benzoyl peroxide were added and maintained at 70°–74° C. for 1½ hours, 1 part benzoyl peroxide was then added and heated 1¼ hour. To the reactants were then added 316 parts isopropanol and 1 part benzoyl peroxide and heated at 70°–74° C. for 2½ hours. At which point another 1 part benzoyl peroxide was added and the mixture heated at 70°–73° C. for 4½ hours. Upon cooling a conversion at 97.5% was obtained. Samples of the interpolymer solution were blended with Tyzor AA (A commercially available chelated ester of orthotitanic acid) and tested giving the results displayed in Table I.

In accordance with standard tests of the Pressure Sensitive Tape Council (PSTC), test samples were prepared by casting the adhesive onto a 2 mil. Mylar polyester film (DuPont) to provide a solid resin coating of 1.5 to 2.0 mil nominal thickness. After casting, the coated film was dried at 25° C. and 50% relative humidity for 15 minutes followed by oven curing at 93° C. for 2 minutes. The cured films were stored for 24 hours under the same drying conditions noted above. The respective samples were provided with a silicone release paper backing and cut into 1" and ½" strips.

In accordance with PSTC-1, 1" strips were applied to stainless steel test panels (ASTM 1000-65) with a Pressure Sensitive Tape Council roller. Peel strength pursuant to this test was determined on an Instron Test Machine, which measured the force required to remove the strip, at a pull rate of 12 inches per minute and at an angle of 180°. This test was performed 15 minutes after initial wet down and again 24 hours later. In accordance with PSTC 5 (90° quick stick), a 1" strip sample was dropped onto a stainless steel plate and pulled at a 90° angle. Again the results indicate the force required to remove the strip.

Pursuant to PSTC 7 (Shear test), a 1000 gm weight was applied to a ½" by ½" strip at 25° C. The result is reported in terms of the time it took the 1000 gm load to pull the tape from the test point. The 50° C. Creep test is the same as PSTC 7 with the weight reduced to 250 gm and the temperature raised from 25° C. to 50° C. The 20° Hold Test is similar to the shear test, except the weight is reduced to 200 gm and the test bar is inclined 20° back from vertical.

TABLE I

| Test | Control | 0.5% Tyzor AA[1] | 1.0% Tyzor AA[1] |
|---|---|---|---|
| PSTC-1 (180°) | | | |
| Initial | 2.9–3.0# clean | 2.9–2.8# clean | 2.4–2.5# clean |
| 24 Hrs. | 3.3–3.4# clean | 3.2–3.3# clean | 2.9–3.0# clean |
| PSTC-7 (1000 gms) | 4.7–7.3 hr split | 61.3 hrs. clean | 79.6 hrs. clean |
| 20° Hold | 5 hrs. clean | 2.3–3.3 clean | 1.3–1.5 hr. clean |
| 50° Creep | >162 hrs. | >162 hrs. | >162 hrs. |
| PSTC-5 | | | |
| (90° Quick Stick) | | 0.5–1.4# zipper clean | 0.5–1.3# |

[1] Percent based on non-volatiles

EXAMPLE II

A reactor was charged with 668 parts 2-ethylhexyl acrylate, 48 parts ethyl acrylate, 174 parts vinyl acetate, 133.4 parts n-butyl 2-maleoxypropyl carbamate and 551 parts ethyl acetate and slowly heated under $N_2$ to 85° C. At this point 0.64 part benzoyl peroxide was added and heated at 80°–85° C. for 2 hours. Then 130 parts ethyl acetate, 191 parts toluene and 0.64 part benzoyl peroxide was added and the mixture maintained at temperature ½ hour. Then 270 parts methylene chloride, 270 parts isopropanol and 0.64 part benzoyl peroxide were added and the mixture heated at 70°–73° C. 1 1/6 hours. Then 2 part benzoyl peroxide was added and the mixture heated additional 1¾ hours. The mixture was cooled and cut to 35% non-volatiles with isopropanol. Samples of the interpolymer solution were blended with Tyzor AA and tested giving the following results, shown in Table II which show little or no crosslinking.

TABLE II

| Test | Control | 0.17% Tyzor AA[1] | 0.66% Tyzor AA[1] |
|---|---|---|---|
| PSTC-1 (180°) | | | |
| Initial | 3.9 split | 3.9–4.0 split | 3.9–4.0 |
| 24 hrs. | 4.4–4.5# split | 4.1–4.2 split | 4.1–4.2 split |
| PSTC-7 (1000 gm) | <10 sec. split | <10 sec. split | <10 sec. split |
| PSTC-7 (500 gm) | <30 sec. split | <30 sec. split | <30 sec. split |

TABLE II-continued

| Test | Control | 0.17% Tyzor AA[1] | 0.66% Tyzor AA[1] |
|---|---|---|---|
| PSTC-5 (90° Quick Stick) | 1.0–1.6# clean | 1.0–1.5# clean | 1.3# clean |

[1]Percent based on nonvolatiles.

EXAMPLE III

A reactor was charged with 668 parts 2-ethylhexyl acrylate, 48 parts ethyl acrylate, 174 parts vinyl acetate, 99 parts 2-maleoxyethyl N-methylcarbamate, 498 part ethyl acetate and 2 part benzoyl peroxide and slowly heated to 81° C. over a period of one hour. Then 418 parts ethyl acetate and one part benzoyl peroxide were added and maintained at 80°–82° C. for four hours. Then another mixture of 418 parts ethyl acetate and one part benzoyl peroxide was added and heated ½ hour. Next, 225 parts isopropanol was added and the mixture heated another 1½ hours. At this point another one part benzoyl peroxide was added and the mixture was maintained at 79° C. for six hours. The mixture was then cooled and was at 35.2% non-volatiles. Samples of the interpolymer solution were blended with Tyzor AA and tested giving the results displayed in Table III showing crosslinking and property improvement.

TABLE III

| Test | Control | 0.33% Tyzor AA[1] | 1.0% Tyzor AA[1] |
|---|---|---|---|
| PSTC-1 (180°) | | | |
| Initial | 4.2–4.4 clean | 3.6–3.8# clean | 3.3–3.4# clean |
| 24 hrs. | 4.4–5.0# | 3.7–4.0# clean | 3.3–3.4# clean |
| PSTC-7 (1000 gm) | 1.0 split | 14.6 split | 56.8 clean |
| 20° Hold | 13 hr. split | >72 hr. | |
| 50° Creep | 42–42.6 min. | >146 hrs. | >146 hrs. |
| PSTC-5 (90° Quick Stick) | 1.5–2.7# | 0.5–2.2# clean zipper | 1.5–2.0# |

[1]Percent based on nonvolatiles.

We claim:
1. An organic solvent solution comprising;
(a) an interpolymer comprising:
1. 0.2 to 20 weight percent of a vinyl monomer, said monomer containing both a carboxylic acid and a carbamate functionality wherein said carbamate functionality has the following general formula

$$-O-\overset{O}{\underset{\|}{C}}-\underset{R^2}{N}-H$$

wherein $R^2$ represents hydrogen, alkyl, aryl, substituted alkyl and substituted aryl groups;
2. at least 40 weight percent of an ester of acrylic or methacrylic acid containing 7 to 20 carbon atoms;
3. optionally up to 59.8 weight percent of one or more copolymerizable monomers containing an ethylenically unsaturated linkage as the only reactive functional group, said copolymerizable monomers having no more than 25 carbon atoms; and
(b) a metal alkoxide having the formula $R_nT(OR_1)_z$ wherein T is a metal selected from the Group II, III, IV and V of the Periodic Table, R is selected from the group consisting of alkyl radicals of from 1 to 8 carbon atoms and aryl radicals of from 6 to 16 carbon atoms, $R_1$ is selected from the group consisting of aliphatic and substituted aliphatic radicals containing from 1 to 18 carbon atoms, n is an integer whose value is 0 or greater and z is an integer whose value is at least 2 wherein the sum of $n+z$ is greater than 1 and equal to the valence of the metal represented by T.

2. An organic solvent solution as in 1 in which the metal alkoxide is a chelated metal alkoxide.
3. An organic solvent solution as in 2 in which said chelated metal alkoxide is a chelated ester of orthotitanic acid.
4. An organic solvent solution as in 1 in which the vinyl monomer containing both a carboxylic acid and a carbamate functionality has the general formula:

$$HO-\overset{O}{\underset{\|}{C}}-CH=\underset{R^3}{C}-\overset{O}{\underset{\|}{C}}-O-R^5-O-\overset{O}{\underset{\|}{C}}-\underset{R^2}{N}-H$$

wherein $R^5$ represents alkyl, aryl, substituted alkyl or substituted aryl; $R^2$ represents hydrogen, alkyl, aryl, substituted alkyl or substituted aryl; and $R^3$ represents hydrogen, alkyl, aryl, substituted alkyl, substituted aryl or halogen.

5. An organic solvent solution as in 1 in which the vinyl monomer containing both a carboxylic acid and a carbamate functionality is 2-Maleoxyethyl Carbamate or 2-Maleoxyethyl N-Methyl Carbamate.
6. The organic solvent solution as in claim 1 in which the organic solvent comprises at least about 20% by weight of one or more substantially anhydrous alcohols.
7. The organic solvent solution as in claim 5 in which the substantially anhydrous alcohol is a lower alkanol.
8. An organic solvent solution as in claim 2 in which the chelated metal alkoxide is present in an amount between 0.05 and about 5 percent of the total weight of the interpolymer and the chelated metal alkoxide.
9. The adhesive composition of claim 2 comprising excess chelating agent.
10. An organic solvent solution comprising:
(a) An interpolymer comprising:
(1) 0.2 to 20 weight percent of a compound having the general formula:

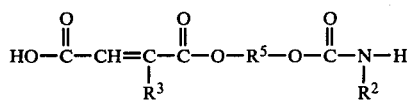

wherein $R^5$ represents alkyl, aryl, substituted alkyl or substituted aryl; $R^2$ represents hydrogen, alkyl, aryl, substituted alkyl or substituted aryl, and $R^3$ represents hydrogen, alkyl, aryl, substituted alkyl, substituted aryl, or halogen (2) At least 40 weight percent of an ester of acrylic or methacrylic acid containing 7 to 20 carbon atoms;

(3) Optionally, up to 59.8 weight percent of one or more copolymerizable monomers containing an ethylenically unsaturated linkage as the only reactive functional group, said copolymerizable monomers having no more than 25 carbon atoms; and (b) A chelated ester of orthotitanic acid in an amount equal to about 0.5 to 5% of the total weight of the chelated ester or orthotitanic acid and the interpolymer.

* * * * *